United States Patent
Ellis

[15] 3,696,617
[45] Oct. 10, 1972

[54] TURBO-FAN PROPULSION APPARATUS AND OPERATING METHOD

[72] Inventor: Peter H. Ellis, Chula Vista, Calif.
[73] Assignee: Rohr Corporation, Chula Vista, Calif.
[22] Filed: Nov. 10, 1969
[21] Appl. No.: 875,201

[52] U.S. Cl. ...........60/229, 60/230, 60/262, 60/264, 181/33 HC, 239/127.3, 239/265.17, 239/265.29
[51] Int. Cl. ............F02k 1/02, F02k 1/20, F02k 3/04
[58] Field of Search................60/264, 262, 229, 230; 239/127.3, 265.17, 265.27, 265.29; 181/334 B, 33 HC

[56] References Cited

UNITED STATES PATENTS

| | | |
|---|---|---|
| 2,997,845 | 8/1961 | Oulianoff..............181/33 HC |
| 3,020,712 | 2/1962 | Dolliver................181/33 HB |
| 3,034,296 | 5/1962 | Keen............................60/229 |
| 3,053,340 | 9/1962 | Kutney.........................60/264 |
| 3,055,615 | 9/1962 | Kerry............................60/262 |
| 3,084,507 | 4/1963 | Kleinhans..............181/33 HB |
| 3,113,428 | 12/1963 | Colley..........................60/262 |

Primary Examiner—Douglas Hart
Attorney—George E. Pearson

[57] ABSTRACT

Fan air of turbo-fan engine flows through ducts which pass through wall of lobed thrust nozzle mounted on aft end of the engine so as to receive exhaust gas discharged therefrom, the ducts terminating within the nozzle and being spaced apart circumferentially thereof. Assembly may include a tubular ejector movable from position around nozzle to position downstream therefrom and provided with thrust reversing doors, or a pair of thrust reversing doors movable from position adjacent aft end of housing which surrounds the engine to position downstream from the nozzle.

6 Claims, 6 Drawing Figures

PATENTED OCT 10 1972

INVENTOR.
PETER H. ELLIS
BY Edwin D. Grant
ATTORNEY

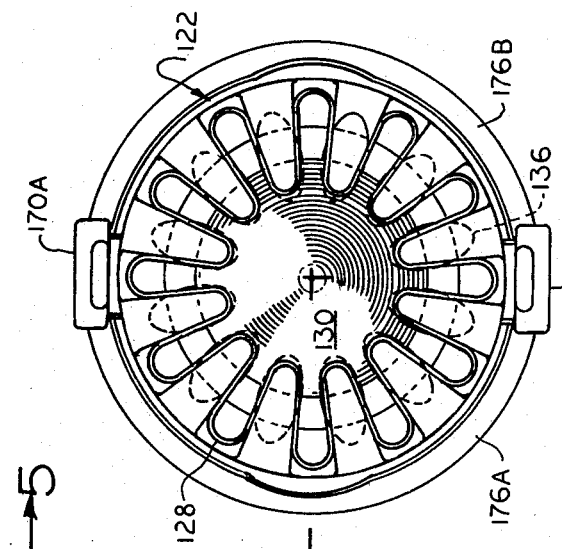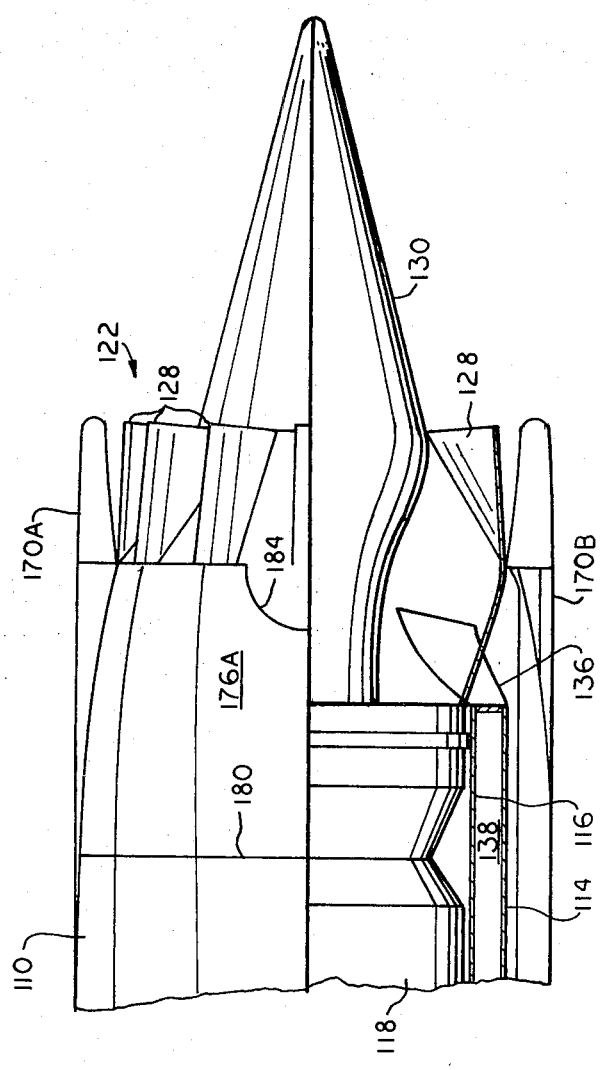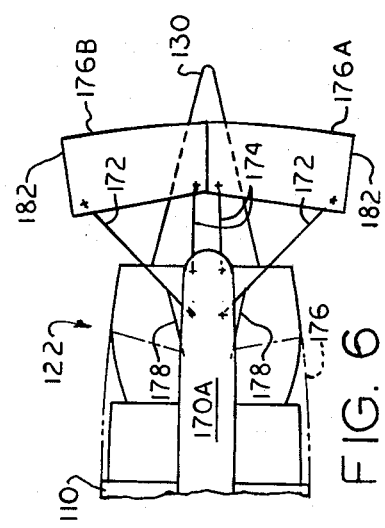

TURBO-FAN PROPULSION APPARATUS AND OPERATING METHOD

SUMMARY OF THE INVENTION

This invention relates to jet-propelled aircraft and more particularly to an improved propulsion system for such aircraft which suppresses the noise of operation of a turbo-fan engine and has the capability of reversing the thrust of said engine at a selected time.

The afore-mentioned advantages are provided, in accordance with the herein disclosed invention, by apparatus wherein a turbo-fan engine is enclosed within a tubular housing, such as an engine nacelle of a multi-engine aircraft. A lobed thrust nozzle is mounted on the aft end of the engine so that exhaust gas is discharged therethrough, and a plurality of ducts communicate with the fan section of the engine so as to receive fan air and discharge the same into the nozzle at points spaced apart circumferentially within the interior thereof. In one embodiment of the invention a tubular ejector is mounted for axial movement relative to the aforesaid housing and nozzle while being maintained in coaxial relation therewith, the ejector having openings located on opposite sides thereof and being provided with thrust reversing doors which in a stowed position respectively close said openings and which in a deployed position extend across the same and deflect exhaust gas and air forwardly therethrough when the ejector is deployed and thrust reversal is required. In a second embodiment of the invention a pair of curved thrust reversing doors are mounted on the engine housing for movement between a position wherein they abut the aft end of said housing and form a streamlined continuation of the wall thereof, and a position wherein they are disposed downstream from the nozzle and intercept exhaust gas and fan air discharged the latter and deflect the same forwardly to reverse the thrust of the propulsion assembly.

DESCRIPTION OF THE DRAWINGS

FIG. 4 is an end view of a second embodiment of the invention.

FIG. 5 is a side elevation of the second embodiment, a quarter-section of certain components thereof being removed in the drawing along the planes represented by line 5—5 in FIG. 4.

FIG. 6 is a plan view of the second embodiment, shown on a reduced scale and illustrating the deployed position of thrust reversing doors associated with the apparatus.

DETAILED DESCRIPTION

First Embodiment

Figure 1:
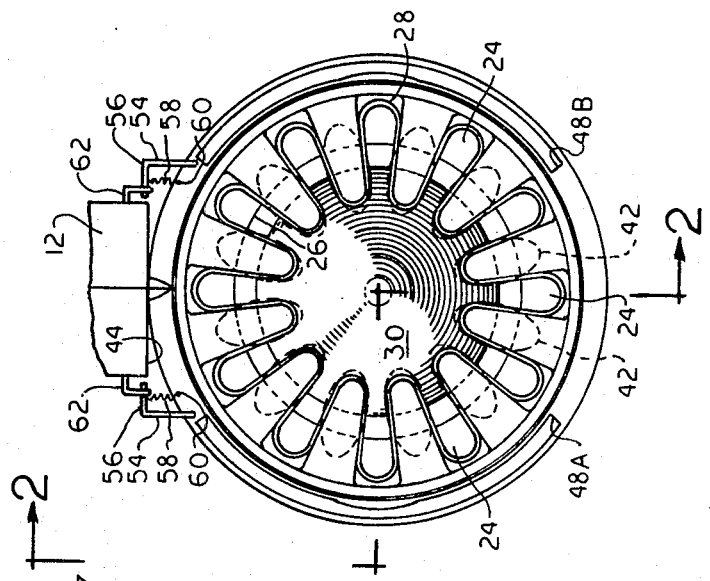
FIG. 1 is an end view of a first embodiment of the invention.
Figure 3:
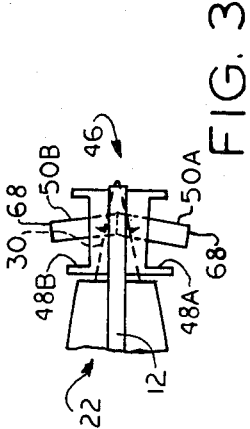
FIG. 3 is a plan view of the same embodiment, shown on a reduced scale and illustrating the deployed position of thrust reversing doors mounted on an ejector incorporated in the apparatus.
Figure 2:
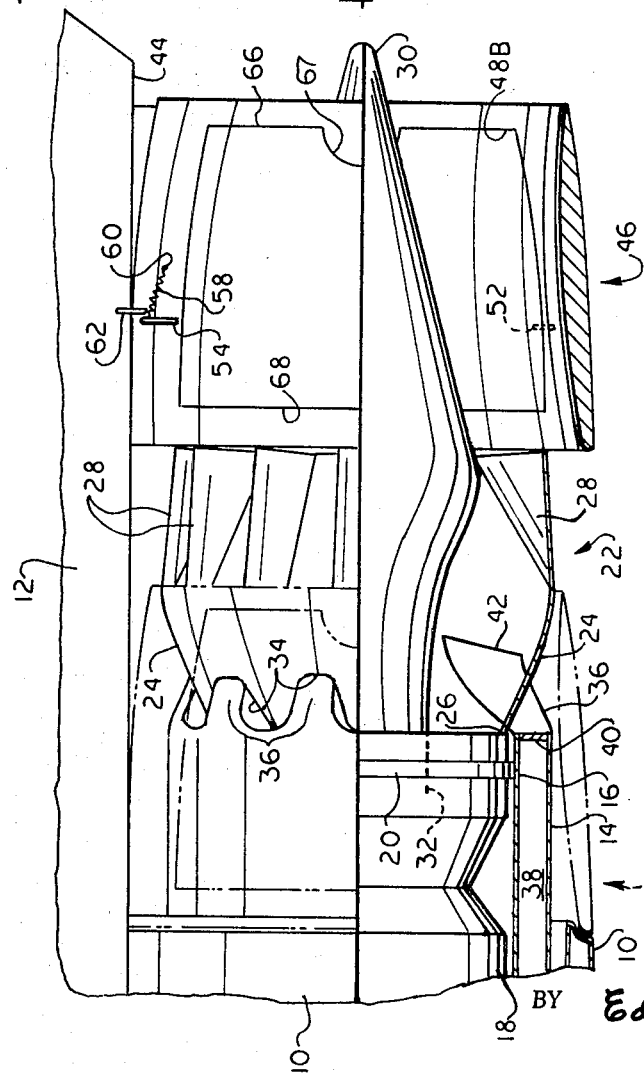
FIG. 2 is a side elevation of the same embodiment, a quarter-section of certain components thereof being removed in the drawing along the planes represented by line 2—2 in FIG. 1.

In a preferred embodiment of the invention illustrated in FIGS. 1–3 a tubular housing 10 is mounted on the lower end of a pylon 12 which depends from an aircraft wing (not shown). Two tubes 14, 16 are disposed in concentric, spaced relation within the aft portion of the housing and project downstream therefrom as illustrated in FIG. 2, and the aft portion of a turbo-fan jet engine 18 extends through the innermost tube 16 and is fixedly connected thereto by means of an annular flange 20. The aft ends of the aforesaid tubes and the engine lie in a plane disposed perpendicular to the longitudinal axis of the housing.

Attached to the aft edge of engine 18 is a thrust nozzle, generally designated by reference number 22 and comprising (1) a frusto-conical wall 24 the forward edge 26 of which is secured to the aft edge of the casing of engine 18, and (2) a plurality of lobes 28 which are spaced apart circumferentially of the aft end of said wall 24 and which extend downstream therefrom.

As can be seen in FIG. 2, the innermost portions of the nozzle wall at the aft end thereof are attached to a hollow plug 30 which in turn is attached to, and extends coaxially downstream from, the aft bearing housing 32 of engine 18. Preferably the portion of the plug which projects from the nozzle is tapered as illustrated.

A plurality of apertures extend through forward wall 24 of the nozzle and are spaced apart circumferentially thereof adjacent the aft edge of the engine casing, the edges 34 of two of these apertures being shown in FIG. 2. Ducts 36 are joined to the aft edges of tubes 14 and 16 so as to communicate with the gap 38 therebetween, and respectively extend rearwardly from said tubes and through the aforesaid apertures in sealed relation with edges 34 thereof. Curved walls 40 (one of which is illustrated in cross section in FIG. 2) respectively extend between, and are joined to, adjacent sides of ducts 36 at the forward ends thereof, said walls also being joined to the portions of the aft edges of tubes 14 and 16 which extend between said ducts. Thus all of the fan air flowing through gap 38 is discharged through the ducts into the interior of nozzle 22 at points spaced apart circumferentially thereof.

As illustrated by broken lines in FIG. 1, the aft edges 42 of the ducts are elliptical in shape, and the aft portions of said ducts are shaped so that fan air is discharged therefrom in a generally downstream direction (see also FIG. 2 wherein the aft portion of one of the ducts is illustrated by broken lines).

The lower edge 44 of pylon 12 extends rearwardly from housing 10 in parallel relation with the common longitudinal axis of said housing and nozzle 22. A tubular ejector, generally designated by reference number 46, is mounted on the pylon for movement longitudinally of edge 44 and between (1) a retracted position wherein the ejector is disposed around tubes 14 and 16 and the forward wall 24 of nozzle 22 in adjacency with the aft end of housing 10 and forms a smooth continuation of the latter (as illustrated by broken lines in FIG. 2) and (2) a deployed position wherein the ejector extends downstream from said nozzle in coaxial relation therewith. The ejector may be mounted on, and moved along, the pylon by apparatus of the type disclosed in U.S. Pat. application, Ser. No. 835,281, filed by Urquhart and Tontini on May 15, 1969, and assigned by them to Rohr Corporation, the assignee of the present application. A pair of openings 48A, 48B (see FIG. 3) extend through the wall of the ejector on opposite sides thereof, and a pair of thrust reversing doors 50A, 50B are pivotally mounted on said ejector for movement between (1) a stowed position wherein they close said openings as illustrated in FIGS. 1 and 2, and (2) a deployed position wherein they are disposed transverse to said openings as illustrated in FIG. 3. Each door 50A, 50B is pivoted to the ejector by means of a pin 52 (one of which is illustrated by broken lines in FIG. 2) positioned in a bearing (not shown) mounted in a recess in the lower edge of a respective one of the openings 48A, 48B, and also by means of a shaft 54 which is fixedly connected at its lower end to the upper edge of the associated door and which extends through a vertically disposed hole formed in the wall of the ejector adjacent the upper edge of the same opening. The upper end of each shaft 54 projects from the outer surface of the ejector, and an arm 56 (see FIG. 1) is fixedly connected thereto and extends laterally therefrom. A spring 58 is connected at one end to each arm 56 and at the other end to a lug 60 projecting from the side of the ejector. Two bars 62 are fixedly mounted on opposite sides of pylon 12 and extend outwardly and then downwardly therefrom so that arms 56 can be respectively engaged therewith.

Operation of the First Embodiment

During takeoff and climb of an aircraft equipped with the above-described propulsion apparatus, ejector 46 is positioned downstream from nozzle 22 and its thrust reversing doors are of course in their stowed position, as illustrated in FIGS. 1 and 2. Exhaust gas of engine 18 is discharged into the annulus between nozzle 22 and plug 30 and flows between ducts 36 and the streams of fan air issuing therefrom, the intermixed exhaust gas and fan air passing through the passages bounded by the lobes 28 of said nozzle. Thus jet streams comprised of exhaust gas and fan air are discharged into the ejector at points spaced apart circumferentially of the throat thereof. Slipstream air also flows between the lobes 28 of the nozzle and enters the ejector in streams which are respectively disposed between the jet streams discharged from said lobes. This flow of air augments the thrust of the propulsion assembly in accordance with well-known principles of ejector action. Since the amount of noise generated by the flow of an aircraft engine jet stream through the atmosphere is proportionate to its temperature and velocity, the mixing of cool, relatively low-velocity fan air and slipstream air with the hot, high-velocity primary exhaust gas of the engine also suppresses the noise of operation of the latter. The ejector can be lined with acoustically absorbent materials. When the disclosed apparatus is operated to augment thrust and suppress noise, ejector 46 is positioned so that arms 56 are spaced a short distance forward of bars 62.

To reverse the thrust of the propulsion unit during the landing of the aircraft provided therewith, the drive mechanism connected to ejector 46 is operated to move the latter from the stowed, or cruise flight, position illustrated by broken lines in FIG. 2 to the position illustrated in FIG. 3, thereby engaging arms 56 with bars 62 and swinging doors 50A, 50B to the deployed position illustrated in the last-mentioned drawing. The aft edges 66 of the doors then abut each other at the longitudinal axis of the ejector, and the streams of air and exhaust gas entering the ejector impinge upon the doors and are deflected forwardly through the openings 48A, 48B in said ejector. The aft edge of each door is formed with a semicircular section 67 which abuts the outer surface of plug 30 when the doors are deployed. Preferably, vanes are mounted at the forward edges 68 of the doors so as to increase the angle of deflection of the streams of air and exhaust gas flowing through the aforesaid openings in the ejector. Such vanes have previously been employed with thrust reversing doors and thus are omitted from the drawings in order to simplify the same. After the aircraft has landed, the drive mechanism connected to the ejector is operated to return it to the stowed position, wherein the forward edge of the ejector abuts the aft edge of housing 10. When arms 56 disengage from bars 62 the springs 58 connected to the arms pull doors 50A, 50B back to the position where they close the openings 48A, 48B in the ejector.

Second Embodiment

FIGS. 4 – 6 illustrate a second embodiment of the invention which is identical to the previously described embodiment with respect to the arrangement of most components thereof. More specifically, fan air of the turbo-fan engine 118 of the second embodiment is arranged to flow through a gap 138 between concentrically disposed tubes 114, 116 which extend rearwardly from a housing 110, and a plurality of circumferentially spaced ducts 136 are attached to the aft ends of these tubes and respectively extend through apertures in the forward portion of a lobed thrust nozzle 122 mounted on the aft end of said engine, thus intermixing fan air with exhaust gas within said nozzle as in the first embodiment. However, the second embodiment of the invention differs from the apparatus illustrated in FIGS. 1 – 3 in that it does not include an ejector. Instead, a pair of elongate support members 170A, 170B are mounted on housing 110 and extend rearwardly therefrom in parallel relation with the longitudinal axis of the housing and nozzle 122. Pivotally mounted on these support members by means of links 172, 174 (see FIG. 6) of the conventional "four bar" type are two thrust reversing doors 176A, 176B, each of said doors being generally hemicylindrical in shape as can be seen in FIG. 4. Shafts 178 are respectively pivoted at one end to the forwardmost links 172 and connected at the other end to a drive mechanism capable of moving the shafts toward and away from housing 110, a suitable mechanism for this purpose being described and illustrated in U.S. Pat. No. 2,968,150, issued to K. W. Goebel on Jan. 17, 1961. As in the aforementioned first embodiment of the invention, a plug 130 is mounted on the aft bearing housing of the turbo-fan engine and extends downstream from the aft end of nozzle 122.

Operation of the Second Embodiment

By means of the drive mechanism associated therewith doors 176A, 176B can be swung between (1) the retracted position illustrated in FIGS. 5 and 6, wherein their forward edges abut the aft edge 180 of housing 110 and the doors form a smooth continuation of said housing, and (2) the deployed position illustrated in FIG. 6, wherein aft edges of the doors abut at the longitudinal axis of nozzle 122. The doors are provided with vanes (not shown) at their forward edges 182 to deflect in a forward direction the stream of exhaust gas and fan air which impinges upon their inner surfaces and flows laterally therealong to said forward edges. The aft edge of each door is formed with a semicircular section 184 (see FIG. 5) which abuts the outer surface of the aft portion of plug 130 when the doors are deployed.

When doors 176A, 176B are in the stowed position slipstream air flows between the lobes 128 of nozzle 122 and thence between the streams of intermixed fan air and primary exhaust gas discharged through said lobes. The jet stream of the described propulsion apparatus thus has a lower temperature and velocity than the primary exhaust gas discharged from engine 118, and the noise of operation of said apparatus is less than that generated by convention propulsion systems which utilize turbo-fan engines.

Modifications of the two embodiments of the invention which have been described and illustrated are obviously possible in view of the teachings disclosed thereby. Hence the scope of the invention must be considered to be limited only by the terms of the subjoined claims.

What is claimed as new and useful and desired to be secured by U.S. Letters Patent is:

1. In combination with an aircraft turbo fan engine: a thrust nozzle mounted on the aft end of said engine to receive exhaust gas and fan air therefrom, said nozzle having a forward portion and an aft portion, said forward portion having a conical wall defining a chamber for mixing engine exhaust gas and fan air, said aft portion being corrugated to define a plurality of peripherally spaced, radially extending lobes, each lobe constituting a rearwardly directed discharge passage for said mixture of exhaust gas and fan air, each pair of adjacent lobes defining between them a flow passage for slipstream ambient air; a plurality of apertures extending through the wall of said forward nozzle portion and spaced apart circumferentially thereof; and a plurality of ducts respectively extending axially of said nozzle and respectively through said apertures in sealed relation therewith, said ducts having their forward ends communicatively connected with said fan of said engine and their aft ends terminating within said mixing chamber forwardly of and on the same longitudinal plane as said ambient air flow passages so that fan air flows therethrough and is discharged into said mixing chamber at points spaced circumferentially thereof.

2. The combination defined in claim 1 including a nozzle plug coaxially mounted on the aft end of said engine and projecting rearwardly from said nozzle.

3. The combination defined in claim 2 including: a tubular ejector operatively associated with said aircraft and movable between (1) a stowed position wherein its forward edge is disposed adjacent the wall of said housing and its aft edge is concentrically disposed adjacent the aft edge of said nozzle and (2) a deployed position wherein its forward edge is concentrically disposed adjacent the aft edge of said nozzle so that said fan air and exhaust gas and slipstream air flows thereinto; and means operatively associated with said aircraft for moving said ejector between said stowed and deployed positions thereof.

4. The combination defined in claim 3 wherein a pair of openings are formed in the wall of said ejector on opposite sides thereof and including a pair of thrust reversing doors mounted on said ejector for movement between (1) a stowed position wherein they respectively close said openings and (2) a deployed position wherein they are disposed transverse to said openings and intercept exhaust gas and fan air discharged from said nozzle into said ejector and deflect the same forwardly through said openings.

5. The combination defined in claim 2 including a pair of thrust reversing doors respectively mounted on opposite sides of said housing for movement between (1) a stowed position wherein they form a streamlined continuation of said housing and (2) a deployed position wherein they are disposed downstream from said nozzle and intercept the intermixed exhaust gas and fan air discharged therefrom and deflect the same forwardly.

6. The combination defined in claim 5 wherein each of said doors is formed so that in said deployed position thereof one of its edges conformably fits around said nozzle plug.

* * * * *